United States Patent [19]

Yamada et al.

[11] 4,273,555
[45] Jun. 16, 1981

[54] AZO COMPOUNDS

[75] Inventors: Yasushi Yamada, Omiya; Hiroshi Ozawa, Koshigaya; Masae Gomi, Toda; Hideshiro Nomura, Urawa, all of Japan

[73] Assignee: Nippon Kayaku Kabushiki Kaisha, Tokyo, Japan

[21] Appl. No.: 73,426

[22] Filed: Sep. 7, 1979

[30] Foreign Application Priority Data

Sep. 22, 1978 [JP] Japan .................. 53-115992

[51] Int. Cl.³ .................................. C09B 27/00
[52] U.S. Cl. ........................... 8/673; 260/168
[58] Field of Search ............ 260/168; 8/673, 687, 8/681

[56] References Cited

U.S. PATENT DOCUMENTS

| | | | |
|---|---|---|---|
| 2,115,852 | 5/1938 | Hannum et al. | 8/673 |
| 2,370,500 | 2/1945 | Sparks | 260/168 |
| 2,417,306 | 3/1947 | Krebser | 260/168 |
| 2,842,538 | 7/1958 | Byland | 260/168 |
| 2,842,539 | 7/1958 | Byland | 260/168 |
| 3,301,629 | 12/1966 | Kramer et al. | 8/673 |

OTHER PUBLICATIONS

Colour Index, Third Ed., vol. 4, 1971, pp. 4325–4339.

Primary Examiner—Winston A. Douglas
Assistant Examiner—Y. Harris-Smith
Attorney, Agent, or Firm—Russell & Nields

[57] ABSTRACT

An azo compound which in the free acid form is represented by the following formula:

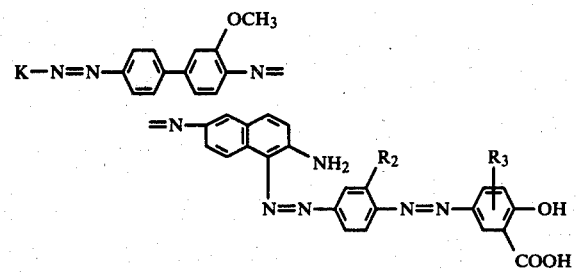

where $R_1$ stands for methyl, ethyl, $R_2$ stands for hydrogen, methyl, methoxy or ethoxy, $R_3$ stands for hydrogen or methyl, and K stands for

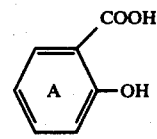

wherein the benzene nucleus A may be further substituted by methyl, amino, acetylamino or methoxy or:

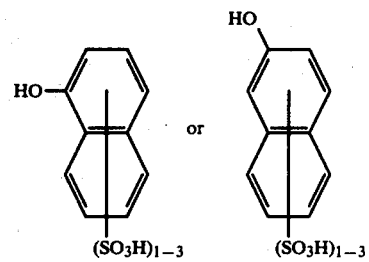

wherein these naphthalene neuclei may be further substituted by hydroxy, amino or acetylamino, also a process for preparing the azo compound and a dyeing method using said azo compound.

7 Claims, No Drawings

AZO COMPOUNDS

DETAILED DESCRIPTION OF THE INVENTION

The present invention relates to an azo compound which, in the free acid form, is represented by the following formula:

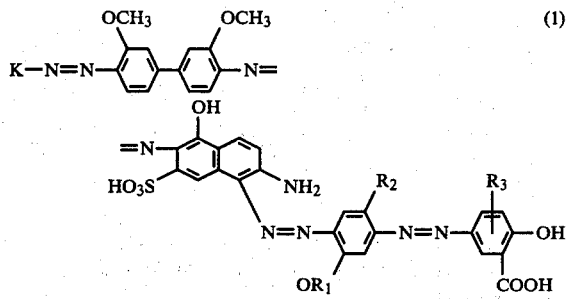

wherein $R_1$ stands for methyl, ethyl, $R_2$ stands for hydrogen methyl, methoxy or ethoxy, $R_3$ stands for hydrogen or methyl, and K stands for

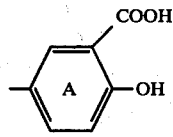

wherein the benzene nucleus A may be further substituted by methyl, amino, acetylamino or methoxy; or

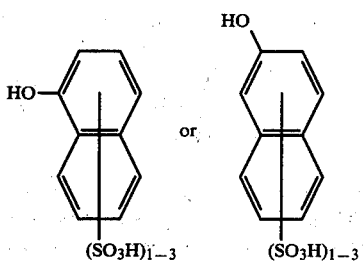

wherein these naphthalene neuclei may be further substituted by hydroxy, amino or acetylamino, also to a process for preparing the azo compound and a dyeing method using this azo compound.

Many direct dyestuffs which can dye cellulose fibers black to navy blue colors with the good light and wet fastness are disclosed in various patent specifications and literature, and various dyes of this type, for example, C.I. Direct Blacks 22, 19, 32, 108 and 121 as black dyestuffs and C.I. Direct Blues 248, 150 and 157 as navy blue dyestuffs, have been marketed.

However, in order to dye polyester/cellulose unions with these dyestuffs, a two bath-two step dyeing method or one bath-two step dyeing method, which is not preferred from the viewpoint of saving labor and energy, must be adopted because (1) the dye adsorption is drastically reduced when polyester/cellulose unions are dyed with such dyestuff together with a disperse dye at a high temperature according to the one bath-one step dip dyeing method, (2) coagulation of the dye is readily caused in a dye bath and (3) the viscosity of dye bath is increased and no level dyeing is obtainable. Accordingly, development of direct dyes capable of providing fast dyeings of navy blue and black colors, which have a good suitabilities for high temperature dyeing in an acid bath (that is, an ability to dye cellulose fibers under dyeing conditions adopted for dyeing polyester fibers with disperse dyes) has been eagerly desired in the art.

The present invention satisfies this requirement, and it is a primary object of the present invention to provide a novel azo compound having a good suitabilities for high temperature dyeing in an acid bath, which can provide a navy blue or black dyeing excellent in the fastnesses and which can dye polyester/cellulose unions together with a disperse dye according to the one bath-one step dyeing method. Another object of the present invention is to provide a process for preparing this novel azo compound and a dyeing method using this novel azo compound.

Azo compounds of the present invention, which are represented by the above formula (1), can be prepared by coupling tetrazotized 4,4'-diamino-3,3'-dimethoxydiphenyl, in an optional order, with one mole of an aminodisazo compound which, in the free acid form, is represented by the following formula:

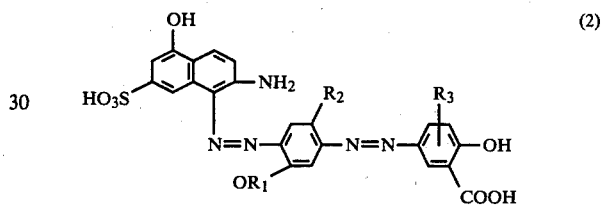

wherein $R_1$, $R_2$ and $R_3$ are as defined above, and 1 mole of a compound represented by the following formula:

wherein K is as defined above.

To describe more precisely, azo compound of formula (1) can be prepared by the following manner [1] 1 mole of tetrazotized 4,4'-diamino-3,3'-dimethoxy-diphenyl is subjected to primary coupling with 1 mole of a coupling component represented by the above formula (3) under neutral or alkaline conditions as a temperature lower than 20° C., preferably a temperature of 0° to 5° C., and the resulting primary coupling product is subjected to secondary coupling with 1 mole of an aminodisazo dye represented by the above formula (2) under alkaline conditions, preferably in the presence of a coupling accelerator such as pyridine.

[2] 1 mole of tetrazotized 4,4'-diamino-3,3'-dimethoxy-diphenyl is subjected to primary coupling with 1 mole of an aminodisazo dye represented by the above formula (2) under neutral or alkaline conditions and then the resulting primary coupling product is subjected to secondary coupling with 1 mole of a coupling component represented by the above formula (3) under alkaline conditions, preferably in the presence of a coupling accelerator such as pyridine.

As the coupling components of the formula (3), there can be mentioned, for example, expressed as free acids, salicylic acid, 3-methyl-2-hydroxybenzene-1-carboxylic acid, 4-methyl-2-hydroxybenzene-1-carboxylic acid, 3,6-dimethyl-2-hydroxybenzene-1-carboxylic acid, 4- methoxy-2-hydroxybenzene-1-carboxylic acid, 4-amino-2-hydroxybenzene-1-carboxylic acid, 4-acetamino-2-hydroxybenzene-1-carboxylic acid, 1-hydroxy-naphthalene-4-sulfonic acid, 1-hydroxy-naphthalene-5-sulfonic acid, 2-hydroxynaphthalene-6-sulfonic acid, 2-8-dihydroxynaphthalene-6-sulfonic acid, 1-hydroxynaphthalene-3, 6-disulfonic acid, 1-hydroxynaphthalene-3, 8-disulfonic acid, 2-hydroxynaphthalene-3, 6-disulfonic acid, 1-hydroxynaphthalene-3, 6, 8-trisulfonic acid, 2-amino-8-hydroxynaphthalene-6-sulfonic acid, 1-acetylamino-8-hydroxynaphthalene-3, 6-disulfonic acid, 1-amino-8-hydroxynaphthalene-3, 6-disulfonic acid, 1-amino-8-hydroxynaphthalene-2, 4-disulfonic acid and 2-amino-5-hydroxynaphthalene-7-sulfonic acid.

As the amino-disazo compound of the formula (2), there can be mentioned, for example, expressed as free acids, the following compounds:

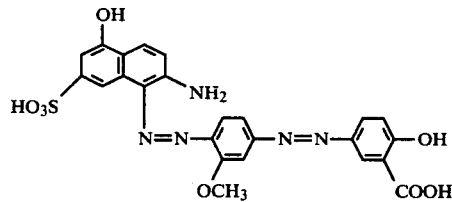

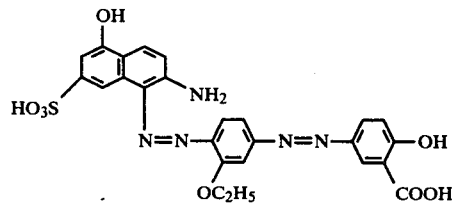

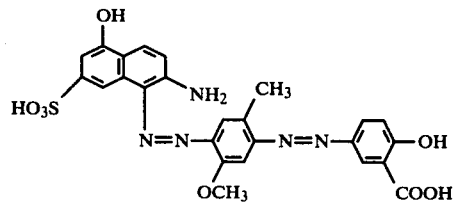

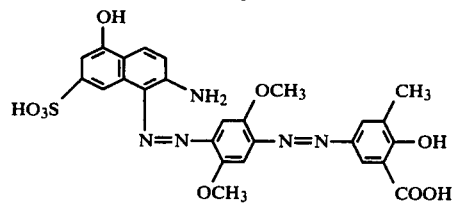

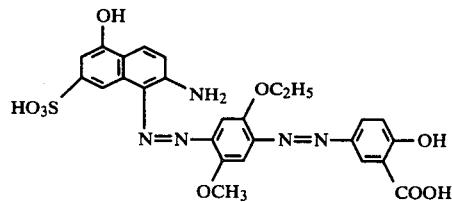

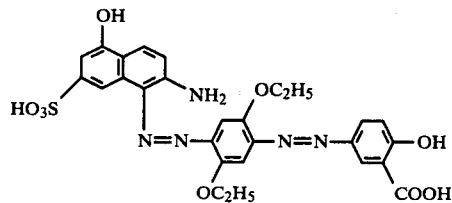

-continued

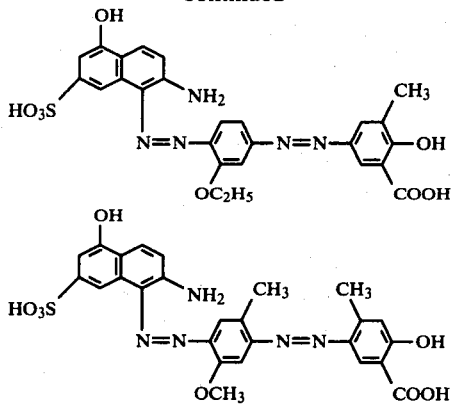

Aminodiazo compounds of the formula (2) can be prepared by diazotizing an amine represented by the following formula:

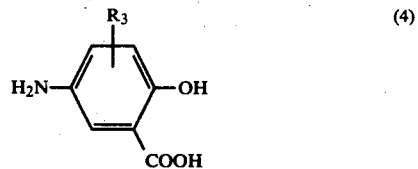

wherein $R_3$ is as defined above,
subjecting the diazotized product to acidic coupling with an amine represented by the following formula:

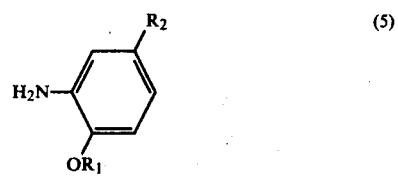

wherein $R_1$ and $R_2$ are as defined above,
or a ω-methane-sulfonation product thereof, if desired, followed by hydrolysis, to form an azo compound, diazotizing the resulting azo compound and coupling the diazotized product with 2-amino-5-hydroxynaphthalene-7-sulfonic acid in the presence of a coupling accelerator.

Among dyes of the present invention represented by the formula (1), those in which K is a residue of salicylic acid, 3-methyl-2-hydroxybenzene-1-carboxylic acid or 1-hydroxynaphthalene-3, 6-disulfonic acid, $R_1$ and $R_2$ each stands for methyl and $R_3$ is hydrogen are especially preferred.

The novel azo compounds of the present invention can dye natural or artificial cellulose fibers such as regenerated cellulose black to navy blue colors with a very high color value, excellent wet fastness and light fastness, by various dyeing methods, for example, dyeing method conducted under usual conditions for dyeing cellulose fibers with direct dyes, such as dipp dyeing, continuous dyeing or printing, dyeing methods conducted under conditions customarily adopted for dyeing polyester fibers with disperse dyes, such as, high temperature dyeing, carrier dyeing, thermosol dyeing or printing, and dyeing methods conducted under conditions customarily adopted for dyeing acrylic fibers with cationic dyes, such as dipp dyeing in aqueous medium or printing.

More specifically, a dye bath or printing paste containing the azo compounds of the present invention or a mixture of the azo compound of the present invention and other dye, for example, a disperse dye or cationic dye, is prepared and cellulose fiber, polyester/cellulose unions or polyacrylonitrile/cellulose unions (in this specifications "unions" means blended fiber, union cloths or union knitted cloths) are treated (dyed or printed) with the so prepared dye bath or printing paste according to an optional dyeing or printing method. Then, the dyed or printed fibers are subjected to a copper treatment, preferably a fixing treatment using a commercially available copper-containing polyamine type fixing agent to form a copper-containing complex salt on the fibers, whereby dyeing is completed.

The azo compound of the present invention, which is represented by the formula (1), has an advantage that when polyester/cellulose unions are dyed with the azo compound of the present invention and a disperse dye by one-bath dyeing operation under dyeing conditions for the disperse dye, cellulose fibers of the unions can be uniformly dyed with a high exhaustion rate.

As the disperse dyes which can be used in combination with the azo compound of the present invention, there can be mentioned, for example, C. I. Disperse Blue 39, C. I. Disperse Blue 49, C. I. Disperse Blue 75, C. I. Disperse Blue 79, C. I. Disperse Blue 125, C. I. Disperse Blue 270, C. I. Disperse Blue 259, C. I. Disperse Blue 283, Sumikalon Black SBL (manufactured by Sumitomo Kagaku), Resolin Black TLS (manufactured by Bayer AG), Samaron Black HTBS Liq. (manufactured by Hoechst AG), Foron black S2BL (manufactured by Sandoz AG) and Kayalon Polyester Black BR-SF (manufactured by NIPPON Kayaku).

The present invention will now be described in detail by the following Examples that by no means limit the scope of the invention.

In these Examples, all of "parts" are by weight unless otherwise indicated, and all the starting compounds and products having water-soluble groups are expressed in the free acid form.

EXAMPLE 1

To 40 parts of water and 10.9 parts by hydrochloric acid were added 4.88 parts of dianisidine, and ice was added to the mixture and tetrazotization was carried out at 13° to 15° C. for 2 hours by using 2.9 parts of sodium nitrite.

Then, an alkali salicylate solution (formed by dissolving 2.9 parts of salicylic acid in the form of a sodium salt into 70 parts of warm water containing an equimolar amount of caustic soda and adding 8.4 parts of soda ash to the solution) were added to the above reaction mixture, and reaction was conducted at a temperature of 2′ to 4° C. and a pH of 9.2 until the presence of the tetrazotized dianisidine solution was not detected by the spot test.

Separately, 11.6 parts of an aminodisazo compound having the following formula:

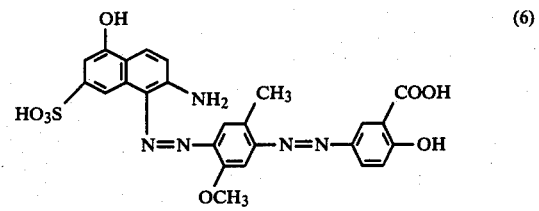

were dissolved in 40 parts of water, 10.2 parts of 29% aqueous ammonia and 90 parts of pyridine. The resulting solution was added to the above primary coupling product solution and the mixture was agitated overnight.

Next morning, pyridine was recovered by steam distillation, and 20.4 parts of a 48% solution of caustic soda were added to the liquid reaction mixture and then, sodium chloride was added in an amount of 15% based on the liquid to effect salting-out, followed by filtration and drying.

The obtained compound is represented by the following formula:

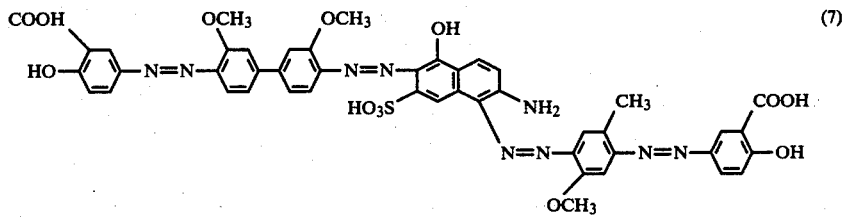

The dye was dissolved in water to form a black-violet solution and the λmax was 575 mμ.

When 3-methyl-2-hydroxybenzene-1-carboxylic acid was used instead of salicylic acid in the above process for the synthesis of the compound of the formula (7), the compound of the formula (1) wherein K is

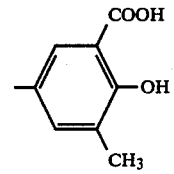

$R_1$ and $R_2$ are methyl $R_3$ is hydrogen was obtained. The compound had properties similar to the compound of formula (7) and dyed cellulose fibers a black color after the copper treatment. The λmax of a solution of this dye was 582 mμ.

When an amino disazo compound represented by the following formula:

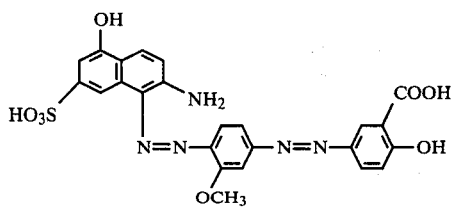
(8)

and an amino disazo compound represented by the following formula:

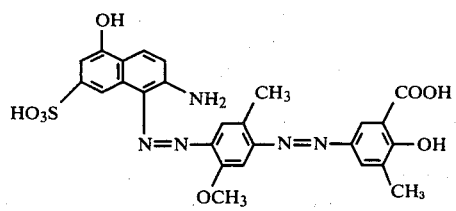
(9)

were used instead of the amino disazo compound of the formula (6) in the above process for the synthesis of the compound of the formula (7), the compound of formula (1) wherein K is

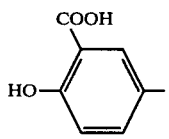

$R_1$ is methyl, $R_2$ and $R_3$ are hydrogen and the compound of formula (1) wherein K is

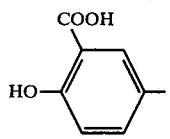

$R_1$ and $R_2$ are methyl, $R_3$ is methyl attached to o-position of —OH were obtained. These compounds had properties similar to the compound of formula (7) and dyed cellulose fibers black after the copper treatment. The λmax of solutions of these compounds were 570 mλ and 579 mμ, respectively.

EXAMPLE 2

In the same manner as described in Example 1, 4.88 parts of dianisidine were tetrazotized, and a solution formed by dissolving 6.8 parts of 1-naphthol-3,6-disulfonic acid in 80 parts of water by neutralization with caustic soda was added to the diazotized solution. When a soda ash solution was added to the liquid mixture to adjust the pH to 8.0 and the liquid mixture was maintained at 2' to 4' C., the primary coupling reaction was completed in a short time.

Separately, 11.6 parts of the aminodisazo compound of the above-mentioned formula (6) were dissolved in 40 parts of water, 10.2 parts of 29% aqueous ammonia and 90 parts of pyridine. The resulting solution was added to the above liquid mixture in which the primary coupling reaction had been completed, and the mixture was agitated overnight.

Next morning, pyridine was recovered by steam distillation, and 20.4 parts of a 48% solution of caustic soda was added to the residue and sodium chloride was then added in an amount of 13% based on the liquid to salt out the dye, followed by filtration and drying.

The obtained compound was found to have the following formula:

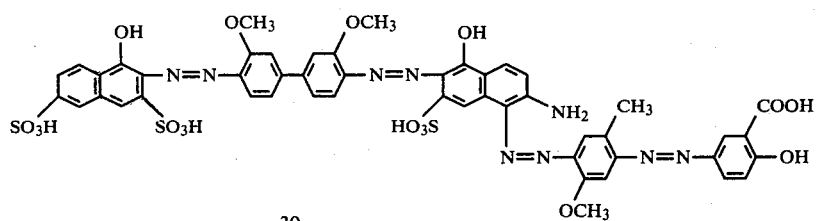
(10)

and was dissolved in water to form a blue solution having a λmax of 596 mμ.

When 1-naphthol-3, 8-disulfonic acid was used instead of 1-naphthol-3, 6-disulfonic acid in the above process for the synthesis of the compound of the formula (10), there was obtained a dye which was dissolved in water to form a blue solution having a λmax of 586 mμ. These dye had properties similar to compound of Example 1 and dyed cellulose a navy blue color after the copper treatment, as well as the above-mentioned dye.

When in the above-mentioned process for the synthesis of the compound of the formula (10) the coupling reaction was carried out by using instead of the aminodisazo compound of the formula (6) aminodisazo compounds represented by the following formula (11) and (12):

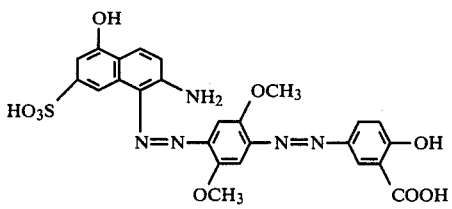
(11)

and

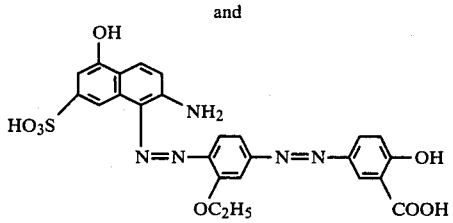
(12)

The compound of formula (1) wherein K is

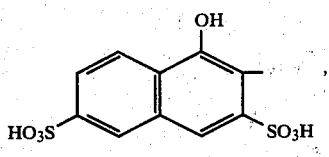

$R_1$ and $R_2$ are $CH_3$, $R_3$ is hydrogen and the compound of formula (1) wherein K is

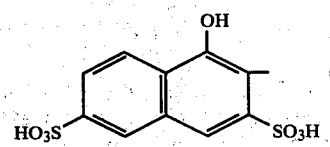

$R_1$ is $-C_2H_5$, $R_2$ and $R_3$ are hydrogen were obtained. These compound had properties similar to the compound of formula (10) and were dissolved in water to form blue solutions having λmax of 598 mμ and 591 mμ, respectively and dyed cellulose a navy blue color after the copper treatment.

EXAMPLE 3

In the process for the synthesis of the compound of the formula (10), described in Example 2, if the order of the coupling reactions with the primary coupling component and the secondary coupling component was reversed while other conditions were not changed, the same compound having a structure represented by the formula (10) was obtained.

EXAMPLE 4

This example illustrates high-temperature one-bath dyeing of a polyester/cotton blended fibers.

A dye bath comprising 1 part of the compound of the formula (7), 2.5 parts of anhydrous sodium sulfate, 3.3 parts of a black dye for polyester fibers formed by mixing C. I. Disperse Blue 146 and C. I. Disperse Blue 73, 0.034 part of sodium acetate trihydrate, 0.038 part of acetic acid and 190 parts of water and having a pH of 5.5 was prepared.

The temperature of the dye bath was maintained at 50° C. and 63 parts of a polyester/cotton (65/35) blended fiber was immersed in the dye bath. The temperature was elevated to 130° C. over a period of 30 minutes and the dyeing operation was conducted for 45 minutes at this elevated temperature. Then, the temperature was lowered to 90° C. over a period of 15 minutes and the dyeing operation was further conducted at this temperature for 15 minutes.

The dyed fiber was taken out from the bath, washed with water, subjected to a useful fixing treatment with a commercially available copper-polyamine type fixing agent, washed with water and dried.

The obtained dyed polyester/cotton blended fiber had a standard dyeing density (black) specified by JIS and the obtained dyeing was excellent in the light fastness and wet fastness.

EXAMPLE 5

This example illustrates high-temperature one-bath dyeing of a polyester/cotton blended fiber.

A dye bath comprising 1 part of the compound of the formula (10), 7.6 parts of anhydrous sodium solfate, 3.7 parts of C. I. Disperse Blue 259, 0.72 part of sodium acetate trihydrate, 0.42 part of acetic acid and 570 parts of water and having a pH of 4.5 was prepared.

The temperature of this dye bath was maintained at 50° C. and 19 parts of a polyester/cotton (65/35) blended fiber were immersed in the dye bath. The temperature of the bath was elevated to 130° C. over a period of 30 minutes and the dyeing operation was conducted at this elevated temperature for 45 minutes. Then, the temperature was lowered to 90° C. over a period of 15 minutes and the dyeing operation was further conducted at this temperature for 15 minutes.

The dyed fiber was taken out from the dye bath, washed with water, subjected a usual fixing treatment with a commercially available copper-polyamine type fixing agent, washed with water and dried.

The so obtained dyed polyester/cotton blended fiber had a standard dyeing density (navy blue) specified by JIS and the obtained dyeing was excellent in the light fastness and wet fasteness.

EXAMPLE 6

This example illustrates dyeing of an polyacrilonitrile/cotton blended fiber.

A dye bath comprising 1 part of the compound of the formula (10), 16 parts of anhydrous sodium sulfate, 0.4 part of a black dye for polyacrylonitrile fibers formed by mixing C. I. Basic blue 41, C. I. Basic Red 27 and C. I. Basic Green 4, 1.51 parts of sodium acetate trihydrate, 0.89 part of acetic acid, 2.4 parts of Sunsalt LS (precipitation-preventing agent manufactured by Nikka Kagaku) and 1178 parts of water and having a pH of 4.5 was prepared.

The temperature of the so prepared dye bath was maintained at 50° C. and 40 parts of polyacrilonitrile/cotton (50/50) blended fiber were immersed in the bath. The temperature of the bath was elevated to 100° C. over a period of 20 minutes and the dyeing operation was conducted at this temperature for 30 minutes.

The dyed fiber was taken out from the bath, washed with water, subjected to a customary fixing treatment with a commercially available copper-polyamine type fixing agent, washed with water and dried.

The so obtained dyed polyacrilonitrile/cotton blended fiber had a standard dyeing density (navy blue) specified by JIS and the dyeing was excellent in the light fastness and wet fastness.

What is claimed is:

1. An azo compound which, in the free acid form, is repesented by the following formula:

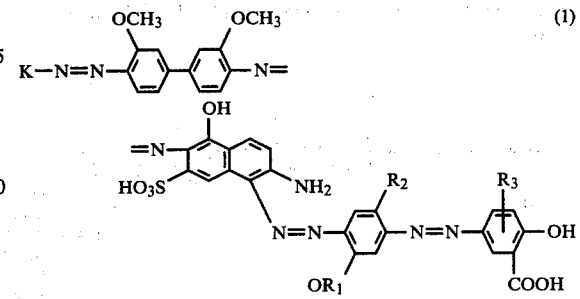

wherein $R_1$ stands for methyl or ethyl, $R_2$ stands for hydrogen, methyl, methoxy or ethoxy, $R_3$ stands for hydrogen or methyl, and K stands for

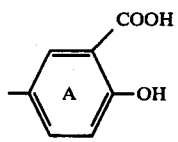

wherein the benzene nucleus A may be further substituted by methyl, amino, acetyl amino or methoxy; or

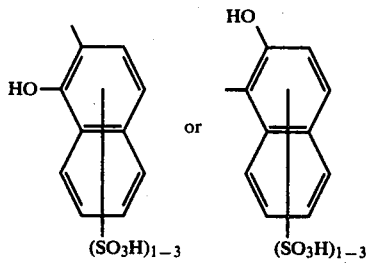

wherein these naphthalene nuclei may be further substituted by hydroxy, amino or acetylamino.

2. An azo compound as set forth in claim 1 which, in the free acid form, is represented by the following formula:

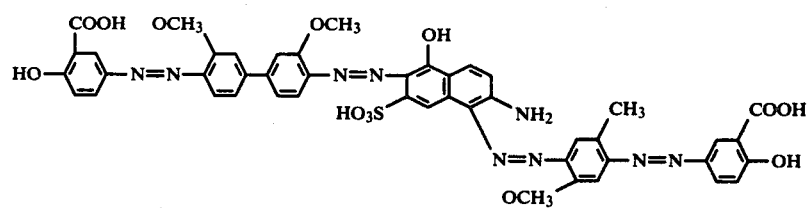

3. An azo compound as set forth in claim 1 which, in the free acid form, is represented by the following formula:

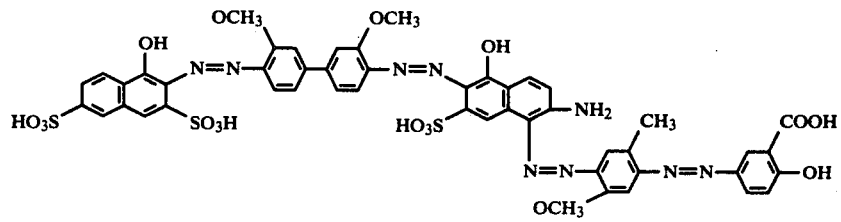

4. An azo compound as set forth in claim 1 which, in the free acid form, represented by the following formula:

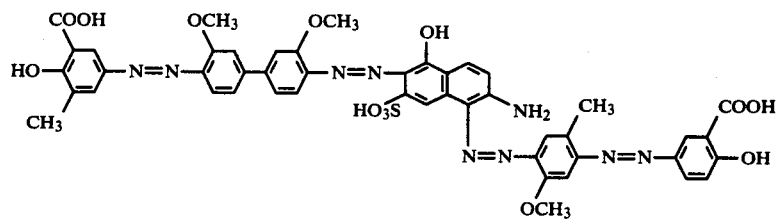

5. A process for the preparation of an azo compound which, in the free acid form, is represented by the following formula:

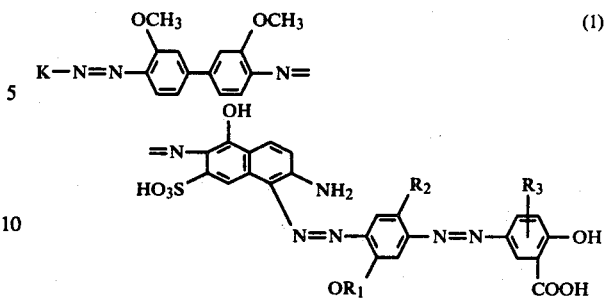

wherein $R_1$, $R_2$, $R_3$ and K are as defined in claim 1, which comprises coupling one mole of tetrazotized 4,4'-diamino-3,3'-dimethoxydiphenyl, in an optional order, with one mole of an aminodisazo compound which, in the free acid form, is represented by the following formula:

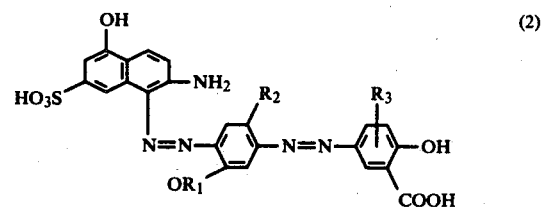

wherein $R_1$, $R_2$ and $R_3$ are as defined in claim 1, and 1 mole of a compound represented by the following formula:

$$K-H \qquad (3)$$

wherein K is as defined in claim 1.

6. A method for dyeing cellulose fibers which comprises treating cellulose fibers with an azo compound which, in the free acid form, is represented by the following formula:

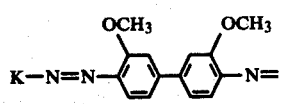 (1)

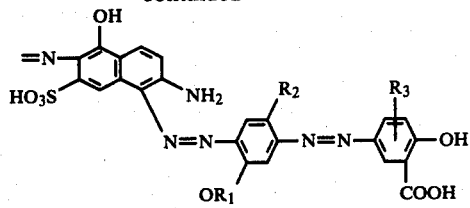

wherein $R_1$, $R_2$, $R_3$ and K are as defined in claim 1, and subjecting the dyed cellulose fibers to a copper treatment.

7. A dyeing method according to claim 6 wherein the cellulose fibers are in the form of a polyester/cellulose or polyacribonitrile/cellulose unions.